US010967914B2

(12) United States Patent
Sasaki et al.

(10) Patent No.: US 10,967,914 B2
(45) Date of Patent: Apr. 6, 2021

(54) ARRANGEMENT STRUCTURE OF ELECTRICAL APPARATUS IN ELECTRIC AUTOMOBILE

(71) Applicant: HONDA MOTOR CO., LTD., Tokyo (JP)

(72) Inventors: Tomomi Sasaki, Wako (JP); Takanori Suzuki, Wako (JP); Kotaro Ishino, Wako (JP); Yuki Kitamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 135 days.

(21) Appl. No.: 16/362,799

(22) Filed: Mar. 25, 2019

(65) Prior Publication Data
US 2019/0300063 A1 Oct. 3, 2019

(30) Foreign Application Priority Data

Mar. 30, 2018 (JP) .............................. JP2018-067259

(51) Int. Cl.
B62D 25/08 (2006.01)
B60R 16/02 (2006.01)
(Continued)

(52) U.S. Cl.
CPC .............. B62D 25/082 (2013.01); B60K 1/00 (2013.01); B60R 16/02 (2013.01); B62D 1/195 (2013.01);
(Continued)

(58) Field of Classification Search
CPC ...... B62D 25/082; B62D 1/197; B62D 21/15; B62D 1/195; B62D 25/08; B62D 5/0409;
(Continued)

(56) References Cited

U.S. PATENT DOCUMENTS 5,775,455 A * 7/1998 Cho ...................... B60K 17/30
180/264
7,373,315 B2 * 5/2008 Chernoff ................ B60G 7/003
705/26.1
(Continued)

FOREIGN PATENT DOCUMENTS

EP 3235672 A1 10/2017
FR 2645819 A1 10/1990
(Continued)

OTHER PUBLICATIONS

Extended European Search Report dated Sep. 16, 2019, issued in counterpart EP application No. 19165451.6. (7 pages).
(Continued)

Primary Examiner — Pinel E Romain
(74) Attorney, Agent, or Firm — Westerman, Hattori, Daniels & Adrian, LLP

(57) ABSTRACT

To provide an arrangement structure of electrical apparatuses in an electric automobile which can realize space savings of a space housing a plurality of electrical apparatuses. An arrangement structure of electrical apparatuses in an electric automobile includes: a vehicle body having a driver cabin and a housing space provided forward of the driver cabin; a plurality of electrical apparatuses (junction board, charger, voltage converter, battery heater) housed in the housing space; and a frame body retaining the plurality of electrical apparatuses to overlap vertically, in which a specific electrical apparatus positioned more downwards than a predetermined position among the plurality of electrical apparatus is arranged more downwards as having a shorter length in the front/rear direction of the vehicle body, or as having a shorter length in the width direction of the vehicle body.

8 Claims, 5 Drawing Sheets

(51) Int. Cl.
  *B62D 1/19* (2006.01)
  *B60K 1/00* (2006.01)
  *B62D 21/15* (2006.01)
  *B60K 1/04* (2019.01)

(52) U.S. Cl.
  CPC ............ *B62D 1/197* (2013.01); *B62D 21/15* (2013.01); *B60K 2001/0411* (2013.01); *B60Y 2306/01* (2013.01); *B60Y 2400/61* (2013.01); *B60Y 2410/10* (2013.01)

(58) Field of Classification Search
  CPC ... B60K 1/00; B60K 2001/0411; B60R 16/02; B60Y 2306/01; B60Y 2410/10; B60Y 2400/61
  USPC ..................................................... 296/187.09
  See application file for complete search history.

(56) References Cited

U.S. PATENT DOCUMENTS

| | | | | |
|---|---|---|---|---|
| 9,199,537 | B2* | 12/2015 | Hotta | B60L 58/20 |
| 9,266,565 | B2* | 2/2016 | Yamanaka | B60L 3/003 |
| 9,505,441 | B2* | 11/2016 | Merkel | B60K 1/00 |
| 10,654,367 | B2* | 5/2020 | Ichida | H01M 8/2465 |
| 2007/0051549 | A1* | 3/2007 | Fukuda | B60L 50/66 |
| | | | | 180/232 |
| 2013/0119760 | A1 | 5/2013 | Amano et al. | |
| 2013/0220718 | A1 | 8/2013 | Gotou et al. | |
| 2013/0341963 | A1* | 12/2013 | Hirano | B60L 53/22 |
| | | | | 296/187.03 |
| 2014/0097641 | A1* | 4/2014 | Hayano | B62D 25/085 |
| | | | | 296/187.09 |
| 2019/0084397 | A1* | 3/2019 | Yugami | B62D 21/152 |
| 2019/0359246 | A1* | 11/2019 | Lee | B62D 21/14 |

FOREIGN PATENT DOCUMENTS

| | | |
|---|---|---|
| JP | H06-197417 A | 7/1994 |
| JP | H09-272459 A | 10/1997 |
| JP | 11-278286 A | 10/1999 |
| JP | 2013-103586 A | 5/2013 |
| JP | 2015-157534 A | 9/2015 |

OTHER PUBLICATIONS

Office Action dated Nov. 12, 2019, issued in counterpart JP application No. 2018-067259, with English translation. (7 pages).

Office Action dated Jun. 16, 2020, issued in counterpart JP Application No. 2018-067259, with English translation (7 pages).

\* cited by examiner

ARRANGEMENT STRUCTURE OF ELECTRICAL APPARATUS IN ELECTRIC AUTOMOBILE

This application is based on and claims the benefit of priority from Japanese Patent Application No. 2018-067259, filed on 30 Mar. 2018, the content of which is incorporated herein by reference.

BACKGROUND OF THE INVENTION

Field of the Invention

The present invention relates to an arrangement structure of electrical apparatuses in an electric automobile.

Related Art

Conventionally, in an electric automobile, an arrangement structure for preventing a plurality of electrical apparatuses housed in a space at the front part of the vehicle body from being crushed during a collision by the frame has been known (for example, refer to Patent Document 1). According to this arrangement structure, it is possible to protect high-voltage electrical apparatuses such as the PCU during collision.

Patent Document 1: Japanese Unexamined Patent Application, Publication No. 2013-103586

SUMMARY OF THE INVENTION

However, with the conventional arrangement structure of electrical apparatuses, there has been room for improvement in the space savings of the space housing the plurality of electrical apparatuses.

The present invention has been made taking account of the above, and an object thereof is to provide an arrangement structure of electrical apparatuses in an electric automobile which can realize a space savings in the space housing a plurality of electrical apparatuses.

An arrangement structure of electrical apparatuses in an electric automobile according to a first aspect of the present invention (for example, the arrangement structure 1 of electrical apparatuses described later) includes: a vehicle body (for example, the vehicle body 2 described later) having a driver cabin (for example, the driver cabin S1 described later) and a housing space (for example, the housing space S2 described later) provided forward of the driver cabin; a plurality of electrical apparatuses (for example, the junction board 3, charger 4, voltage converter 5, battery heater 6 described later) which is housed in the housing space; and a frame body (for example, the frame body 12 described later) which retains the plurality of electrical apparatuses to overlap in a vertical direction, in which regarding a specific electrical apparatus (for example, the charger 4, voltage converter 5, battery heater 6 described later) positioned more downwards than a predetermined position among the plurality of electrical apparatuses, the specific electrical apparatus is disposed more downwards as having a shorter length in the front/rear direction of the vehicle body, or as having shorter length in the width direction of the vehicle body.

According to the first aspect of the present invention, since the entirety of the specific electrical apparatuses positioned below a predetermined position forms a tapered shape towards downwards in a side view or front view of the vehicle body, it is possible to arrange the frame body retaining the plurality of electrical apparatuses while effectively using the narrow space. Consequently, it is possible to realize space savings of the space which houses the plurality of electrical apparatuses.

According to a second aspect of the present invention, in the first aspect, it is preferable for the specific electrical apparatus to be disposed more downwards as having a shorter length in the front/rear direction, and a center in the front/rear direction to be positioned more to a front side as disposed more downwards.

According to the second aspect of the present invention, by the length in the front/rear direction being shorter as being arranged more downwards, and the center in the front/rear direction being arranged at the front side, it is possible to form a surface on the forward side of the frame body. It is thereby possible to disperse the shock by receiving the shock during collision by this surface.

According to a third aspect of the present invention, in the first or second aspect, it is preferable for the vehicle body to have a wall part (for example, the wall part 14 described later) forming the housing space which is provided on a side of the driver cabin, and a sub-frame (for example, the sub-frame 15 described later) which is positioned below the housing space, and the arrangement structure to further include a steering shaft (for example, the steering shaft 8 described later) installed to the sub-frame at a position surrounded by the frame body, the wall part and the sub-frame in a side view of the vehicle body.

According to the third aspect of the present invention, it is possible to shorten the length of the housing space in the front/rear direction of the vehicle body, due to effectively using the dead space surrounded by the frame body, wall part and sub-frame.

According to a fourth aspect of the present invention, in the third aspect, it is preferable to further include another electrical apparatus (for example, the air-conditioning heater 10 described later) differing from the plurality of electrical apparatuses installed to the wall part which opposes the specific electrical apparatus to interpose the steering shaft, in which the sub-frame, in a case of the housing space being crushed by collision, causes the steering shaft to move downwards by moving downwards accompanying deformation.

According to the fourth aspect of the present invention, since the steering shaft moves downwards during collision, it is possible to prevent the steering shaft from being pinched by the plurality of electrical apparatuses, etc. At the same time, it is possible to sufficiently ensure the collision stroke of the specific electrical apparatuses, i.e. moveable distance during collision, and thus possible to more reliably protect the specific electrical apparatuses.

According to a fifth aspect of the present invention, in any one of the first to fourth aspects, it is preferable for the specific electrical apparatus to be disposed more downwards as having a shorter length in the width direction, and to include electrical wiring disposed in a space produced at a side in the width direction of the electrical apparatus having a short length in the width direction.

According to the fifth aspect of the present invention, since the electrical wiring is suppressed from being arranged to protrude in the width direction from the frame body, it is possible to shorten the length in the width direction of the vehicle body. For this reason, by narrowing the interval between side frames of the vehicle body, it is possible to ensure a large steering angle, and thus an increase in steering angle is possible.

According to a sixth aspect of the present invention, in any one of the first to fifth aspects, it is preferable for the frame body to have a reinforcing plate (for example, the reinforcing plate 23 described later) in which a plurality of convex parts (for example, the convex part 23a described later) extending in the front/rear direction is formed, and the electrical apparatuses to be disposed at a top surface and bottom surface of the reinforcing plate, respectively.

According to the sixth aspect of the present invention, since the plurality of electrical apparatuses is arranged in the vicinity of the reinforcing plate on which convex parts functioning as load paths for receiving the shock during collision are formed, it is possible to more reliably protect the plurality of electrical apparatuses from the shock during collision.

According to a seventh aspect of the present invention, in the sixth aspect, it is preferable for the plurality of electrical apparatuses to be at least four, and two thereamong at a center in the vertical direction being mounted on the reinforcing plate, and for the frame body to have a frame member (for example, the pipes 24, 25 described later) provided on an upper side of the electrical apparatus positioned on the top surface of the reinforcing plate.

According to the seventh aspect of the present invention, at the center in the vertical direction of the frame body, it is possible to disperse the collision load in two systems, by arranging the reinforcing plate on which convex parts functioning as the load paths receiving the shock during collision are formed, and arranging frame members on the upper side thereof. For this reason, it is possible to reliably protect the electrical apparatuses from shock during collision.

According to an eighth aspect of the present invention, in the sixth or seventh aspect, it is preferable for the reinforcing plate to have a notch part (for example, the notch part 23b described later) at a rear side of the front/rear direction.

According to the eighth aspect of the present invention, by passing the high-voltage cable through the notch part at the rear side of the reinforcing plate, it is possible to suppress the high-voltage cable from being pinched and severed during collision.

According to the present invention, it is possible to provide an arrangement structure of electrical apparatuses in an electric automobile which can realize a space savings in the space housing a plurality of electrical apparatuses.

DETAILED DESCRIPTION OF THE INVENTION

Figure 1:
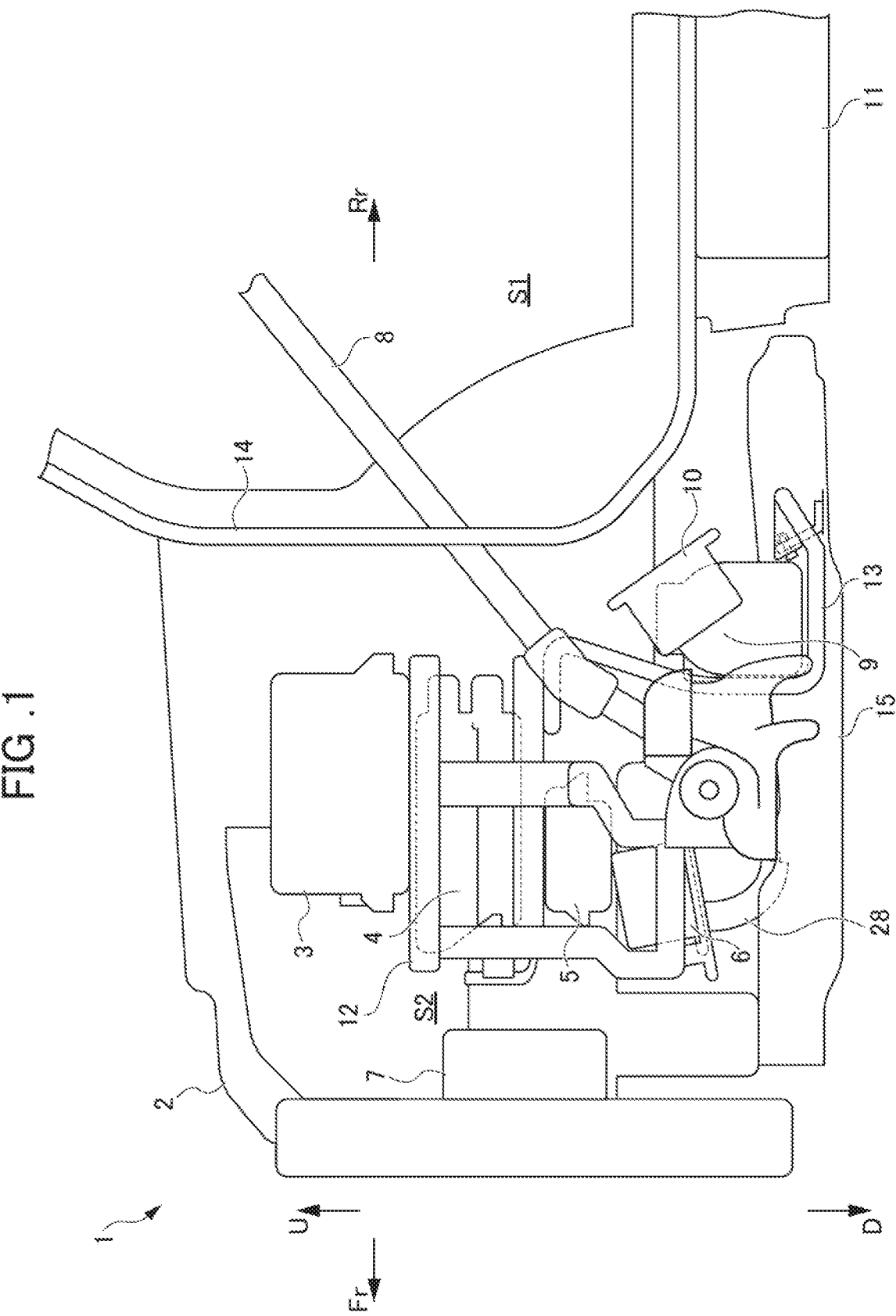
FIG. 1 is an outline side view showing an arrangement structure of electrical apparatuses in an electric automobile according to an embodiment of the present invention.

Hereinafter, an embodiment of the present invention will be explained in detail while referencing the drawings. It should be noted that, in the drawings, the U direction indicates upward, D direction indicates downwards, Fr direction indicates forward of a vehicle body 2, Rr direction indicates rearward of the vehicle body 2, R direction indicates right direction viewed from the driver (right direction in vehicle width), and L direction indicates left direction viewed from the driver (left direction in vehicle width). In addition, collision in the present disclosure indicates a collision from forward mainly.

Figure 2:
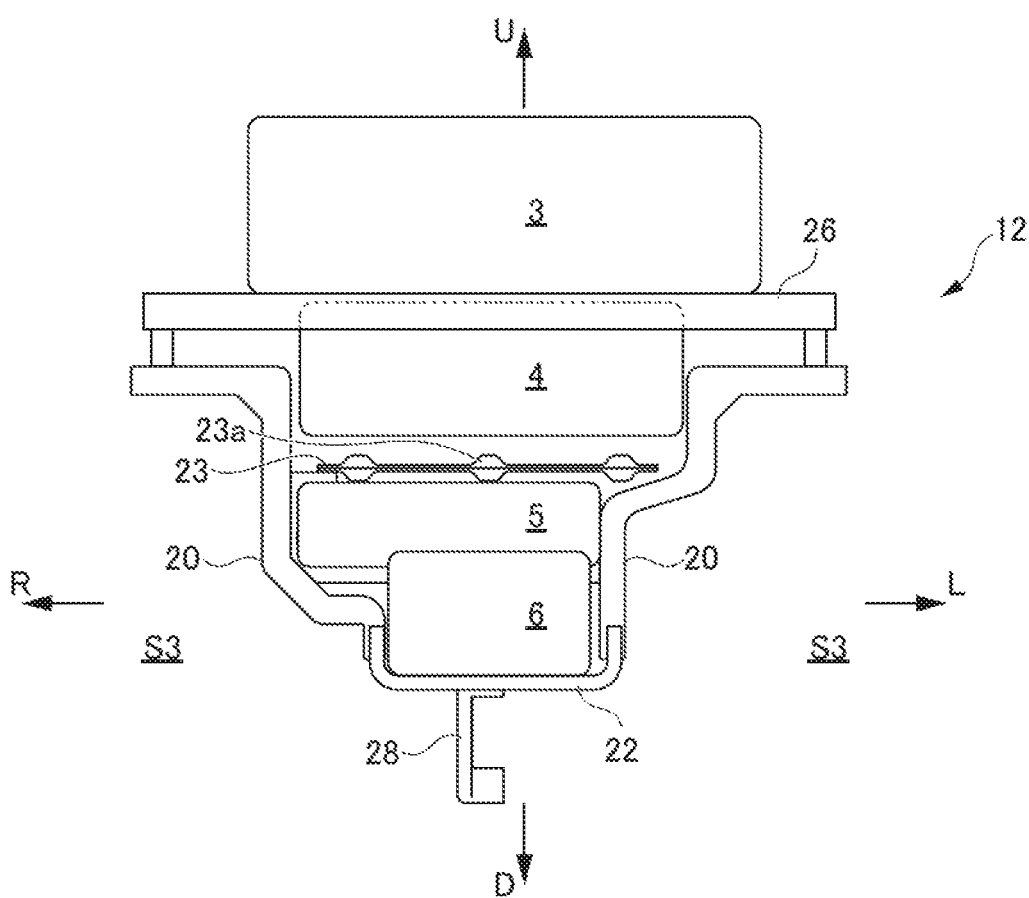
FIG. 2 is an outline front view showing an arrangement structure of electrical apparatuses in an electric automobile according to an embodiment of the present invention.
Figure 3:
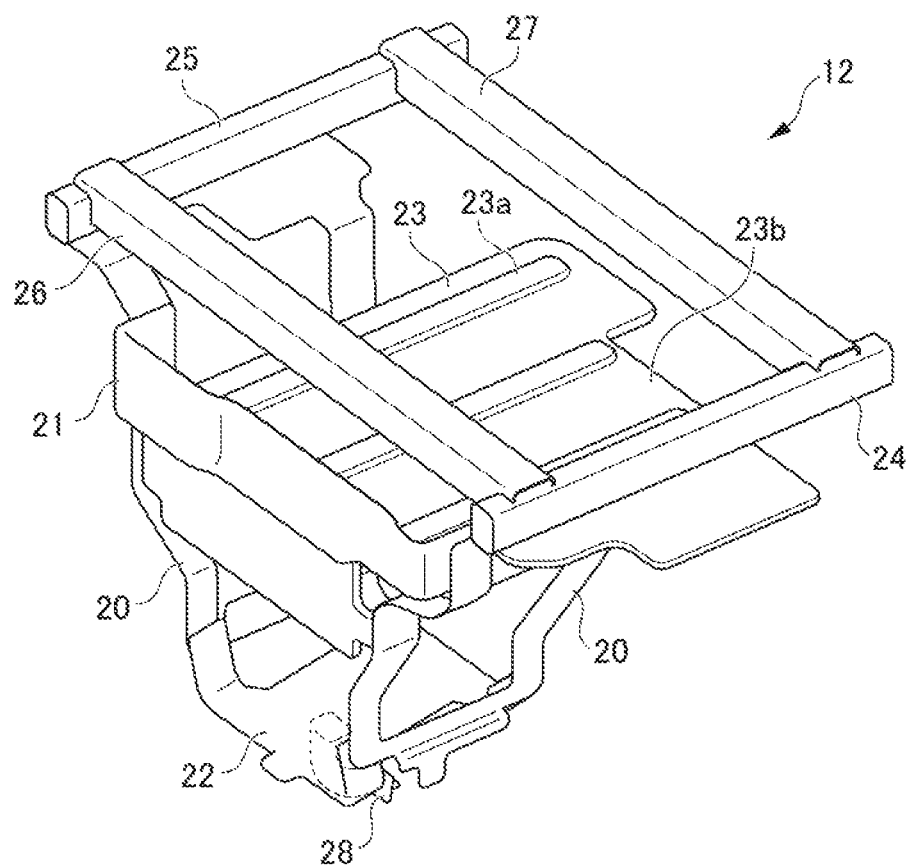
FIG. 3 is a perspective view of a frame body according to an embodiment of the present invention.
Figure 4:
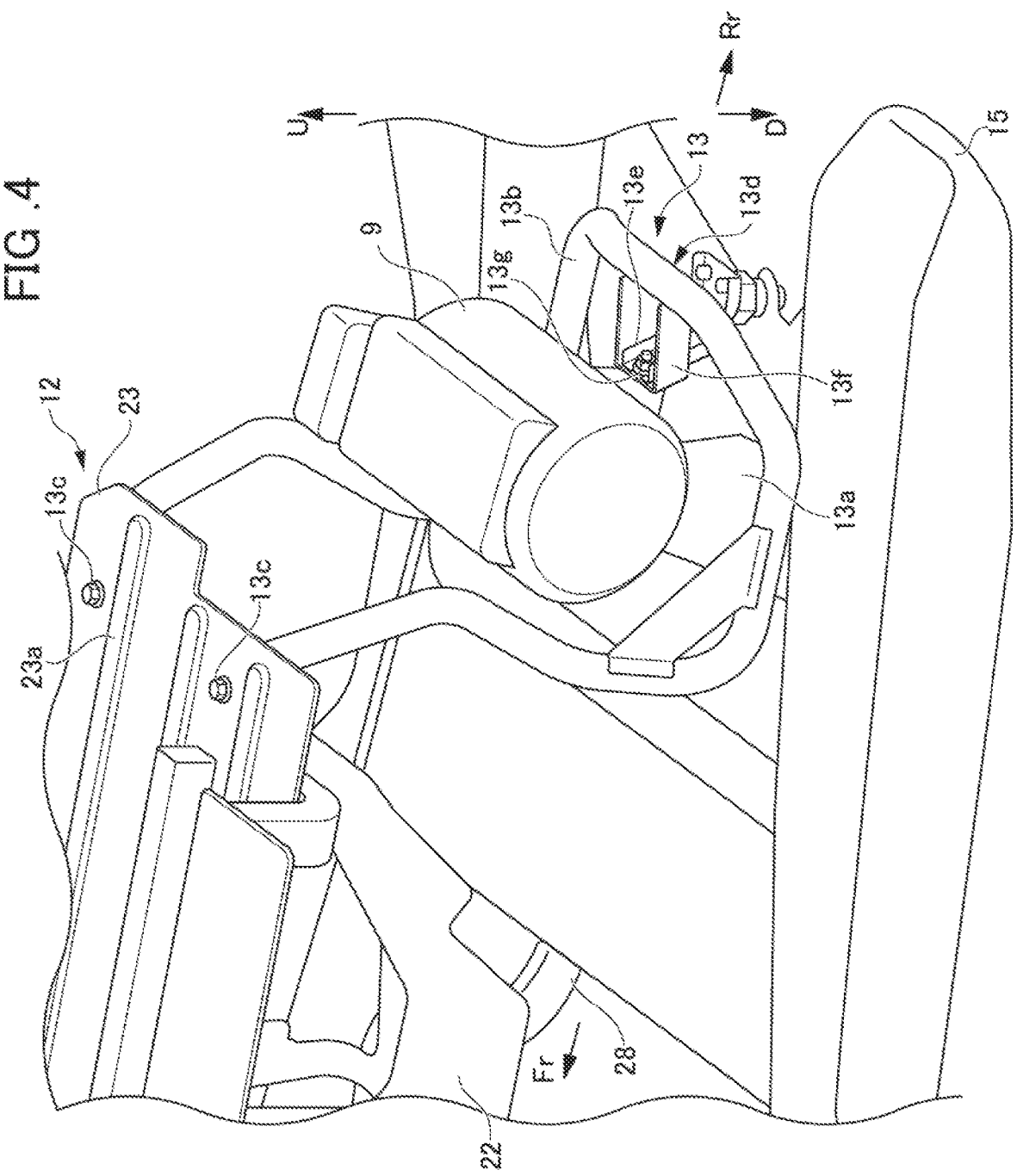
FIG. 4 is an outline perspective view showing a fastening structure of a bracket according to an embodiment of the present invention.

First, the configuration of an arrangement structure 1 of electrical apparatuses in an electric automobile according to the present embodiment will be explained using FIGS. 1 to 4. FIG. 1 is an outline side view showing the arrangement structure 1 of electrical apparatuses in the electric automobile according to an embodiment of the present invention. FIG. 2 is an outline front view showing the arrangement structure 1 of electrical apparatuses in the electric automobile according to an embodiment of the present invention. FIG. 3 is a perspective view of a frame body 12 according to an embodiment of the present invention. FIG. 4 is an outline view showing a fastening structure of a bracket 13 according to an embodiment of the present invention. It should be noted that FIG. 4 is illustrated by omitting a steering shaft 8, etc. for convenience.

As shown in FIGS. 1 and 2, the arrangement structure 1 of electrical apparatuses in the electric automobile according to the present embodiment is arranged forward Fr (front side) of the vehicle body 2. More specifically, the arrangement structure 1 of electrical apparatuses includes the vehicle body 2, a junction board (J/B) 3, a charger (CHG) 4, a voltage converter (DC/DC) 5, a battery heater (BAT HTR) 6, a cooling fan 7, a steering shaft 8, an electric compressor (E-COMP) 9, an air-conditioner heater (CAN HTR) 10, a battery (IPU) 11, a frame body 12, a bracket 13, electrical wiring (not shown), etc. It should be noted that a motor (MOT) (not shown) and power control unit (PCU) (not shown) are arranged at the rear Rr of the vehicle body 2.

The vehicle body 2 has a driver cabin S1, and a housing space S2 provided ahead of this driver cabin S1. This vehicle body 2 has a wall part 14, a sub-frame 15, etc. The wall part 14 is a dashboard constituting the housing space S2 provided at a side of the driver cabin S1. The sub-frame 15 is a chassis to which various electric apparatuses, the steering shaft 8, etc are equipped. To this sub-frame 15, a coupling member 28 of a lower end of the frame body 12 and a lower portion at the rear Rr of the bracket 13 are fastened. It should be noted that the sub-frame 15 is configured to include a fragile part such that becomes a starting point of a bend, for example, so as to bend downwards during collision.

The junction board 3 is an electrical apparatus that houses electronic components such as capacitors. This junction board 3 is housed in the housing space S2, in a state mounted on the frame body 12.

The charger 4 is an electrical apparatus which converts electric power supplied from outside, and charges the battery 11. This charger 4 is housed in the housing space S2 in a state mounted on the frame body 12 so as to overlap from below the junction board 3.

The voltage converter 5 is an electrical apparatus which converts the voltage of the battery 11, upon charging the battery (not shown) for a gauge from the battery 11. This voltage converter 5 is housed in the housing space 2, in a state mounted to the frame body 12 so as to overlap from below the charger 4. In addition, compared to the charger 4, the voltage converter 5 has a shorter length in the front/rear direction of the vehicle body 2, a shorter length in the width direction of the vehicle body 2, and the center in the front/rear direction is positioned at the front side.

The battery heater 6 is an electrical apparatus which keeps the battery 11 at the desired temperature using the electricity of the battery 11. This battery heat 6 is housed in the housing space S2, in a state mounted to the frame body 12 so as to overlap from below the voltage converter 5. In addition, the battery heater 6, compared to the voltage converter 5, has a shorter length in the front/rear direction of the vehicle body 2, a shorter length in the width direction of the vehicle body 2, and the center in the front/rear direction is positioned more to the front side.

It should be noted that, among the plurality of electrical apparatuses (junction board 3, charger 4, voltage converter 5, battery heater 6) mounted to the frame body 2, the charger 4, voltage converter 5 and battery heater 6 positioned below a predetermined position are called specific electrical apparatus. In other words, this specific electrical apparatus constitutes a part of the above-mentioned plurality of electrical apparatuses. "predetermined position" referred to herein may be a position at which the voltage converter 5 and battery heater 6 can be called specific electrical apparatuses and the junction board 3 cannot be called a specific electrical apparatus and, for example, is a position at which the pair of left/right pipes 24, 25 (refer to FIG. 3) described later is provided. It should be noted that a specific electrical apparatus may be arranged above the predetermined position.

The charger 4, voltage converter 5 and battery heater 6, which are the respective specific electrical apparatuses, are respectively arranged more downwards as having a length shorter in the front/rear direction of the vehicle body 2, or as having a shorter length in the width direction of the vehicle body 2. In other words, the charger 4, voltage converter 5 and battery heater 6, which are specific electrical apparatuses, are arranged in the order of the charger 4, voltage converter 5 and battery heater 6 from top to bottom.

The cooling fan 7 is one component of the radiator which cools the cooling medium flowing through the radiator. This cooling fan 7 is provided at the front of the vehicle body 2, and positioned ahead of the frame body 12.

The steering shaft 8 is a component of power steering which assists steering of the driver. This steering shaft 8 is mounted to the sub-frame 15 at a position surrounded by the frame body 12, wall 14 and sub-frame 15, in a side view of the vehicle body 2.

The electric compressor 9 is an electrical apparatus (other electrical component) which performs air-conditioning of the driver cabin S1 using the electricity of the battery 11. The electric compressor 9 is housed in the housing space S2 in a state mounted to the bracket 13. This electric compressor 9 is installed to the wall 14 which opposes the battery heater 6, which is a specific electrical apparatus to sandwich the steering shaft 8, in a side view of the vehicle body 2. In other words, this battery heater 6, steering shaft 8 and electric compressor 9 are arranged on a line in the front/rear direction of the vehicle body 2.

The air-conditioner heater 10 is an electrical apparatus which performs heating of the driver cabin S1, by cooperating with the electric compressor 9, using the electricity of the battery 11. This air-conditioner heater 10 is housed in the housing space S2, in a state mounted to the wall part 14.

The battery 11 is a storage battery which supplies electric power to various electrical apparatuses. This battery 11 is arranged behind the sub-frame 15, and below the driver cabin S1.

The frame body 12 is a frame which retains a plurality of electrical apparatuses (junction board 3, charger 4, voltage converter 5, battery heater 6) housed in the housing space S2 to be overlapping in the vertical direction. This frame body 12 is housed in the housing space S2, in a state retaining the plurality of electrical apparatuses (junction board 3, charger 4, voltage converter 5, battery heater 6) to be overlapping in the vertical direction.

As shown in FIG. 3, the frame body 12 has a tapered shape towards downwards in a side view and front view of the vehicle body 2. More specifically, the frame body 12 has a pair of left/right lateral frames 20, a front frame 21, lower frame 22, a reinforcing place 23, pair of left/right pipes (frame member) 24, 25, pair of front/rear upper frames 26, 27, a connection member 28, etc. In addition, the frame body 12 is fastened to the side frame via a bracket (not shown) which extends outwards in the vehicle width direction from a flat part above the pair of left/right lateral frames 20.

The pair of left/right lateral frames 20 is connected together by the front frame 21, lower frame 22, reinforcing plate 23, and pair of front/rear upper frames 26, 27. This pair of left/right lateral frames 20 covers the sides of the charger 4 mounted on the top surface of the reinforcing plate 23 (refer to FIGS. 1 and 2), voltage converter 5 (refer to FIGS. 1 and 2) mounted on the bottom surface of the reinforcing plate 23, and battery heater 6 mounted on the top of the lower frame 22 (refer to FIGS. 1 and 2).

The front frame 21 is arranged in front of the reinforcing plate 23, by being bridged in a vertical orientation to the front of the pair of left/right lateral frames 20. The front frame 21 thereby covers the front of the charger 4 mounted on the top of the reinforcing plate 23 (refer to FIGS. 1 and 2), and the voltage converter 5 mounted on the bottom surface of the reinforcing plate 23 (refer to FIGS. 1 and 2).

The lower frame 22 is bridged sideways below the pair of left/right lateral frames 20. The battery heater 6 (refer to FIGS. 1 and 2) is mounted on the top of this lower frame 22. The lower frame 22 covers below the battery heater 6 mounted on the top of this lower frame 22 (refer to FIGS. 1 and 2).

The reinforcing plate 23 is a member made by overlapping two metal sheets, and is bridged sideways at the center in the vertical direction of the pair of left/right lateral frames 20. The charger 4 (refer to FIGS. 1 and 2) is mounted on top of the reinforcing plate 23. In addition, a plurality of convex parts 23a which extend in the front/rear direction is formed on the top of the reinforcing plate 23.

In addition, the reinforcing plate 23 has a notch part 23b in which a high-voltage cable (omitted from drawings) passes through, at the rear side in the front/rear direction. It thereby suppresses the high-voltage cable from being pinched and severed during collision. The voltage converter 5 (refer to FIGS. 1 and 2) is mounted to the bottom surface of the reinforcing plate 23.

The pair of left/right pipes 24, 25 is provided at the upper side of the charger 4 positioned on the top of the reinforcing plate 23 (refer to FIGS. 1 and 2), by being mounted above the pair of left/right lateral frames 20, so as to extend in the front/rear direction.

The pair of left/right upper frames 26, 27 is bridged to the pair of left/right pipes 24, 25 so as to extend in the width direction. The junction board 3 (refer to FIGS. 1 and 2) is arranged above the pair of left/right upper frames 26, 27. The charger 4 (refer to FIGS. 1 and 2) is arranged below the pair of left/right upper frames 26, 27.

The connection member 28 is mounted to the lower frame 22, and detachably fastened to the sub-frame 15, so as to extend downwards from the lower frame 22. In the case of the housing space S2 being crushed in a collision, the frame body 12 thereby detaches from the sub-frame 15 which moves downwards accompanying deformation such that bends downwards (refer to FIG. 5). It should be noted that the detaching mechanism of this connection member 28 is a similar structure as the detaching mechanism of the bracket 13 described later, and thus explanation thereof is omitted herein.

Referring back to FIG. 1, the bracket 13 is housed in the housing space S2, in a state supporting the electric compressor 9 housed in the housing space S2. In addition, the electrical wiring (omitted from drawings) is arranged in the spaces S3, S3 produced at both sides in the width direction of the electrical apparatus which have a relatively short length in the width direction (voltage converter 5, battery heater 6). It is thereby unnecessary to arrange the electrical wiring to project in the width direction from the frame body 12, and it becomes possible to shorten the length in the width direction of the vehicle body 2.

The bracket 13 is configured to include a support part 13a at which the electric compressor 9 is arranged and fixed, and a tubular frame part 13b for coupling this support part 13a to the frame body 12 and sub-frame 15, as shown in FIG. 4. The frame part 13b is provided to extend so as to surround the electric compressor 9, and has a pair of top parts 13c, 13c fixed (screwed) to the bottom surface of the rear end part of the reinforcing plate 23 of the frame body 12. At the same time, a bottom part 13d on the rear side of the frame part 13b is detachably fastened to the sub-frame 15.

In more detail, a connection fitting 13e which obliquely extends forwards Fr to upwards is mounted to the sub-frame 15, and an engaging fitting 13f that is screwed to engage with this connection fitting 13e is mounted to the bottom part 13d on the rear side. A notch 13g is formed in the connection fitting 13e, and a screw is fastened via this notch.

For this reason, in the case of the housing space S2 being crushed in a collision, the bracket 13 is disengaged by the above-mentioned notch 13g being released, and connection between the connection fitting 13e and engaging fitting 13f is released. The bracket 13 thereby drops out from the sub-frame 15 which moves downwards accompanying deformation (refer to FIG. 5), a result of which the connection state with the sub-frame 15 is released.

Figure 5:
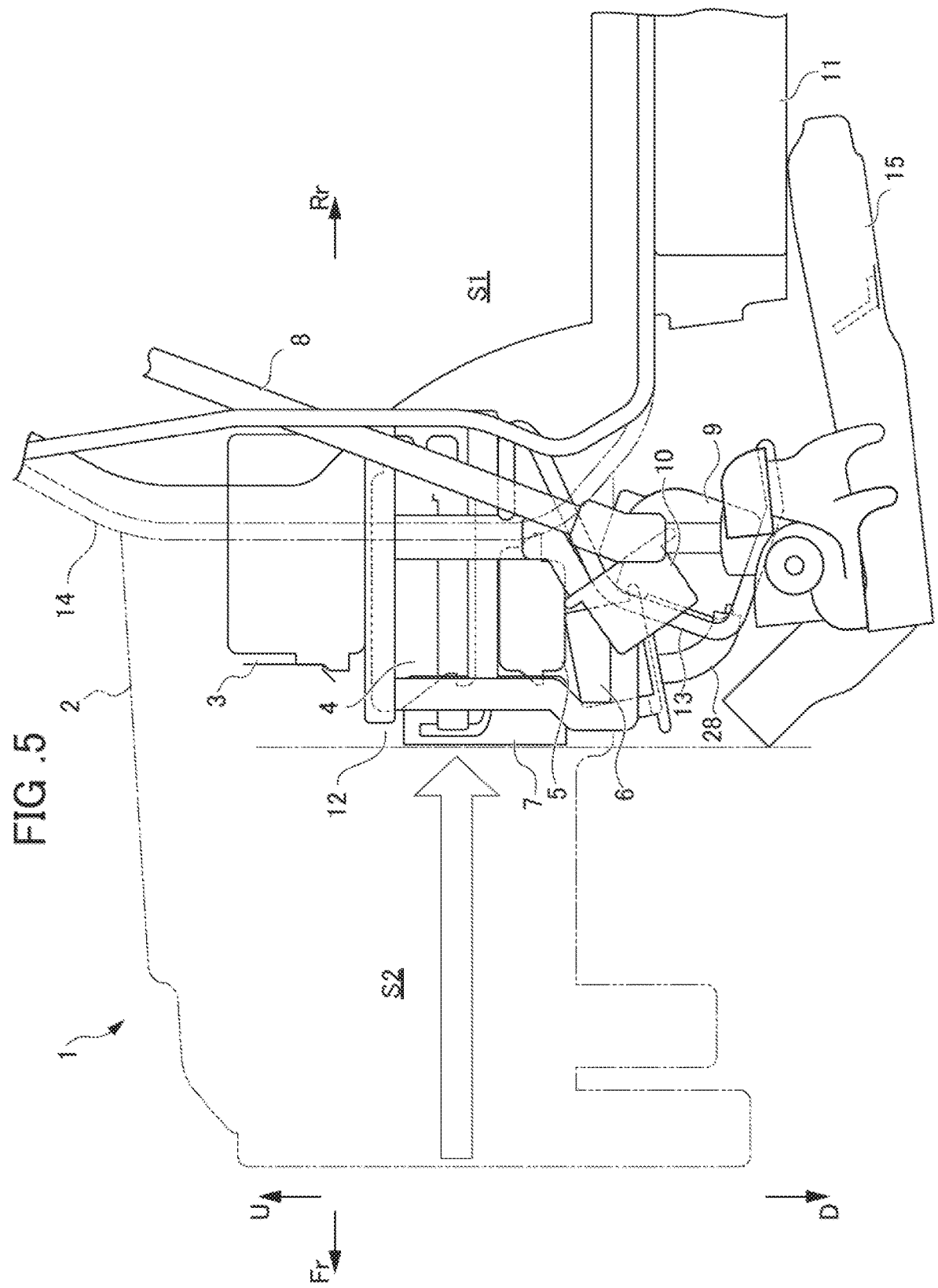
FIG. 5 is an outline side view showing an arrangement structure of electrical apparatuses in an electric automobile according to an embodiment of the present invention, and shows a state in which a housing space was crushed by collision.

Next, the arrangement structure 1 of electrical apparatuses in a state in which the housing space S2 was crushed by collision will be explained using FIG. 5. FIG. 5 is an outline side view showing the arrangement structure 1 of electrical apparatuses in an electric automobile, and shows a state in which the housing space S2 was crushed by collision.

As shown in FIG. 5, when the front of the vehicle 2 is crushed by collision, the cooling fan 7 moves rearwards, causing the plurality of electrical apparatuses (junction board 3, charger 4, voltage converter 5, battery heater 6) retained to the frame body 12 to move rearwards, and causing the electric compressor 9 supported by the bracket 13 to move rearwards and downwards. At this time, the sub-frame 15 moves downwards accompanying deformation so as to bend downwards, causing the steering shaft 8 to move downwards, and the connection state between the sub-frame 15 and bracket 13 to be released. It is thereby configured so that the steering shaft 8 is suppressed from being pinched during collision, and the collision stroke (moveable distance during collision) of the specific electrical apparatuses (charger 4, voltage converter 5, battery heater 6) will be ensured.

According to the arrangement structure 1 of electrical apparatuses in the electric automobile according to the present embodiment equipped with the above configuration, the following effects are exerted.

First, according to the present embodiment, since as a whole of the plurality of electrical apparatuses (charger 4, voltage converter 5, battery heater 6), which are specific electrical apparatuses positioned below a predetermined position, form a tapered shape towards downwards in a side view or front view, it is possible to equip the frame body 12 retaining the electrical apparatuses (junction board 3, charger 4, voltage converter 5, battery heater 6) by effectively applying the narrow space. Consequently, it is possible to realize space savings of the housing space S2 which houses the plurality of electrical apparatuses (junction board 3, charger 4, voltage converter 5, battery heater 6).

In addition, according to the present embodiment, by forming a surface on the front side of the frame body 12, it is possible to disperse the shock during collision.

In addition, according to the present embodiment, since the dead space surrounded by the frame body 12, wall part 14 and sub-frame 15 is effectively used, it is possible to shorten the length in the front/rear direction of the vehicle body 2 of the housing space S2.

In addition, according to the present embodiment, it is possible to prevent the steering shaft 8 from being pinched during collision, and ensure the collision stroke (moveable distance during collision) of the specific electrical apparatuses (charger 4, voltage converter 5, battery heater 6).

In addition, according to the present embodiment, it is unnecessary to position the electrical wiring to protrude in the width direction from the frame body 12, and it is possible to shorten the length in the width direction of the vehicle body 2. For this reason, by narrowing the interval of side frames of the vehicle body 2, it is possible to ensure a large steering angle, and thus an increase in steering angle is possible.

In addition, according to the present embodiment, since the plurality of electrical apparatuses (charger 4, voltage converter 5) is arranged in the vicinity of the reinforcing plate 23 which functions as a load path receiving the shock during collision, it is possible to reliably protect the electrical apparatuses (charger 4, voltage converter 5) from shock during collision.

In addition, according to the present embodiment, at the center in the vertical direction of the frame body 12, since it is possible to disperse the collision load in two systems, by positioning the reinforcing plate 23 which functions as the load path receiving the shock during collision, and positioning the pipes 24, 25 on the upper side thereof, it is possible to reliably protect the electrical apparatuses (junction board 3, charger 4, voltage converter 5, battery heater 6) from shock during collision.

In addition, according to the present embodiment, by passing the high-voltage cable (omitted from illustration) through the notch part 23b, it is possible to suppress the high-voltage cable (omitted from illustration) from being pinched and severed during collision.

It should be noted that the present invention is not to be limited to the above-mentioned embodiment, and that modifications, improvements, etc. within a scope that can achieve the object of the present invention are encompassed by the present invention.

In the present embodiment, a case of providing the four of the junction board 3, charger 4, voltage converter 5 and battery heater 6 as the plurality of electrical apparatuses retained to the frame body 12, and the charger 4 and voltage converter 5 which are the two in the middle in the vertical direction thereamong being mounted to the reinforcing plate 23 is explained as an example; however, the present invention is not to be limited thereto. The present invention may be a configuration in which the plurality of electrical apparatuses is four or more, and thereamong, the two in substantially the middle in the vertical direction are mounted to the reinforcing plate.

EXPLANATION OF REFERENCE NUMERALS 1 arrangement structure of electrical apparatuses
2 vehicle body
3 junction board (electrical apparatus)
4 charger (electrical apparatus, specific electrical apparatus)
5 voltage converter (electrical apparatus, specific electrical apparatus)
6 battery heater (electrical apparatus, specific electrical apparatus)
7 cooling fan
8 steering shaft
9 electric compressor
10 air-conditioning heater (other electrical apparatus)
11 battery
12 frame body
13 bracket
14 wall part
15 sub-frame
20 lateral frame
21 front frame
22 lower frame
23 reinforcing plate
23a convex part
23b notch part
24, 25 pipe (frame member)
26, 27 upper frame
28 connection member
S1 driver cabin
S2 housing space

What is claimed is:

1. An arrangement structure of electrical apparatuses in an electric automobile comprising:
    a vehicle body having a driver cabin and a housing space provided forward of the driver cabin;
    a plurality of electrical apparatuses which is housed in the housing space; and
    a frame body which retains the plurality of electrical apparatuses to overlap in a vertical direction,
    wherein, regarding specific electrical apparatuses positioned more downwards than a predetermined position among the plurality of electrical apparatuses, the specific electrical apparatuses are respectively disposed more downwards as having a shorter length in the front/rear direction of the vehicle body, or as having shorter length in the width direction of the vehicle body,
    wherein the frame body has a reinforcing plate in which a plurality of convex parts extending in the front/rear direction is formed,
    wherein the electrical apparatuses are disposed at a top surface and bottom surface of the reinforcing plate, respectively,
    wherein the plurality of electrical apparatuses is at least four, and two intermediate electrical apparatuses thereamong at a central portion in the vertical direction are mounted to the reinforcing plate, and
    wherein the frame body has a frame member provided on an upper side of the electrical apparatus positioned on the top surface of the reinforcing plate.

2. The arrangement structure of electrical apparatuses in an electric automobile according to claim 1, wherein the specific electrical apparatuses are respectively disposed more downwards as having a shorter length in the front/rear direction, and a center thereof in the front/rear direction is positioned more to a front side as disposed more downwards.

3. The arrangement structure of electrical apparatuses in an electric automobile according to claim 1, wherein the vehicle body has a wall part disposed between the driver cabin and the housing space to define the housing space, and a sub-frame which is positioned below the housing space, and
    wherein the arrangement structure further comprises a steering shaft installed to the sub-frame at a position surrounded by the frame body, the wall part and the sub-frame in a side view of the vehicle body.

4. The arrangement structure of electrical apparatuses in an electric automobile according to claim 3, further comprising another electrical apparatus differing from the plurality of electrical apparatuses and installed to the wall part to oppose the specific electrical apparatus to interpose the steering shaft therebetween,
    wherein the sub-frame, in a case of the housing space being crushed by collision, causes the steering shaft to move downwards by moving downwards accompanying deformation.

5. The arrangement structure of electrical apparatuses in an electric automobile according to claim 1, wherein the specific electrical apparatuses are disposed more downwards as having a shorter length in the width direction, and
    wherein the arrangement structure includes electrical wiring disposed in a space produced at a side in the width direction of the electrical apparatus having a short length in the width direction.

6. The arrangement structure of electrical apparatuses in an electric automobile according to claim 1 wherein the reinforcing plate has a notch part at a rear side thereof in the front/rear direction.

7. An arrangement structure of electrical apparatuses in an electric automobile comprising:
    a vehicle body having a driver cabin and a housing space provided forward of the driver cabin;
    a plurality of electrical apparatuses which is housed in the housing space; and
    a frame body which retains the plurality of electrical apparatuses to overlap in a vertical direction,
    wherein, regarding specific electrical apparatuses positioned more downwards than a predetermined position among the plurality of electrical apparatuses, the specific electrical apparatuses are respectively disposed more downwards as having a shorter length in the front/rear direction of the vehicle body, or as having shorter length in the width direction of the vehicle body,
    wherein the vehicle body has a wall part disposed between the driver cabin and the housing space to define the housing space, and a sub-frame which is positioned below the housing space,
    wherein the arrangement structure further comprises a steering shaft installed to the sub-frame at a position surrounded by the frame body, the wall part and the sub-frame in a side view of the vehicle body,
    wherein the arrangement structure further comprises another electrical apparatus differing from the plurality of electrical apparatuses and installed to the wall part to oppose the specific electrical apparatus to interpose the steering shaft therebetween, and wherein the sub-frame, in a case of the housing space being crushed by collision, causes the steering shaft to move downwards by moving downwards accompanying deformation.

8. The arrangement structure of electrical apparatuses in an electric automobile according to claim 7, wherein the specific electrical apparatuses are respectively disposed more downwards as having a shorter length in the front/rear direction, and a center thereof in the front/rear direction is positioned more to a front side as disposed more downwards.

* * * * *